Feb. 8, 1955 T. CARROLL 2,701,634
ROTATABLE CROP FEEDER WITH BEARINGS FOR RETRACTING FINGERS
Original Filed April 22, 1950 4 Sheets-Sheet 3

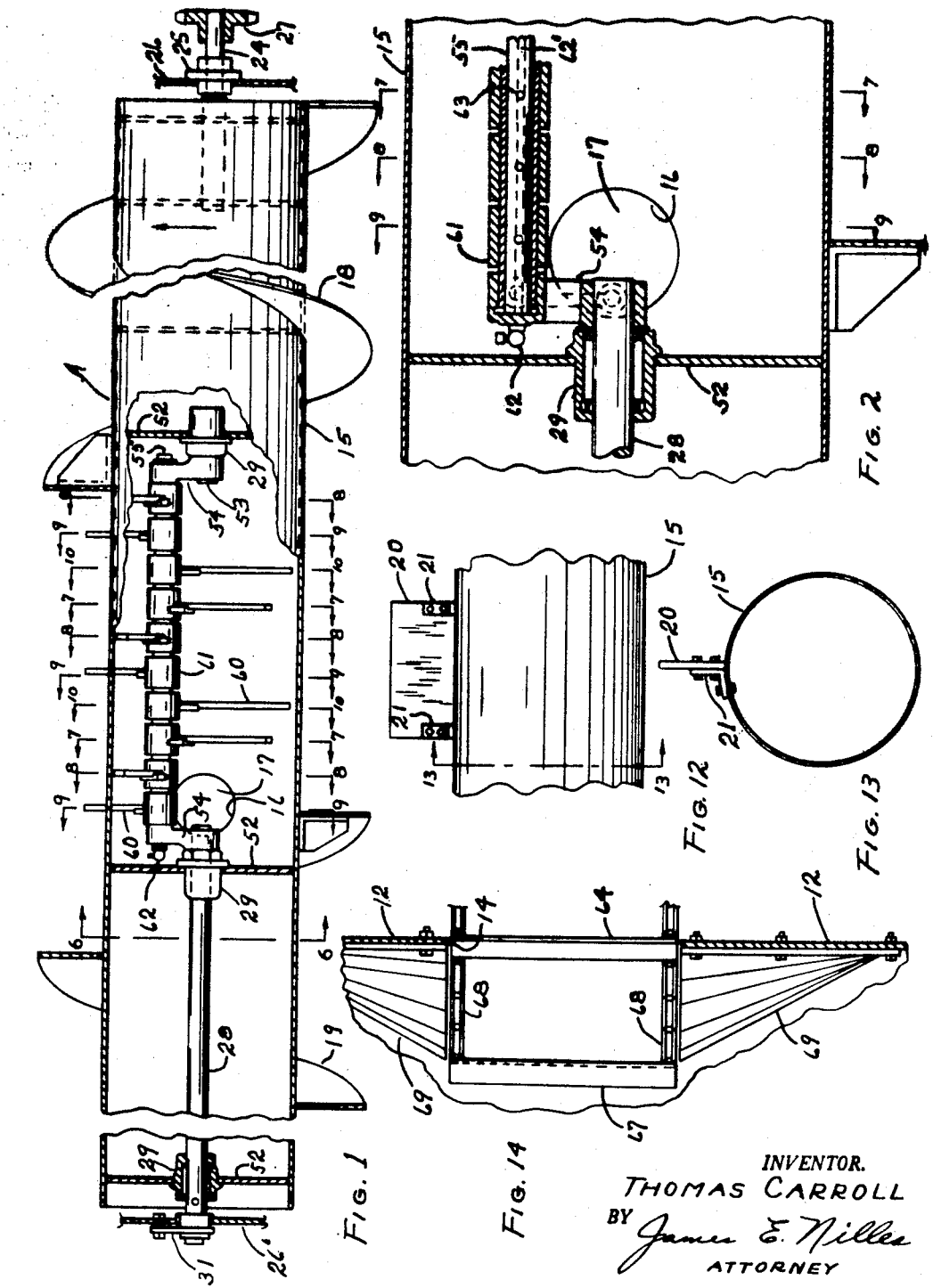

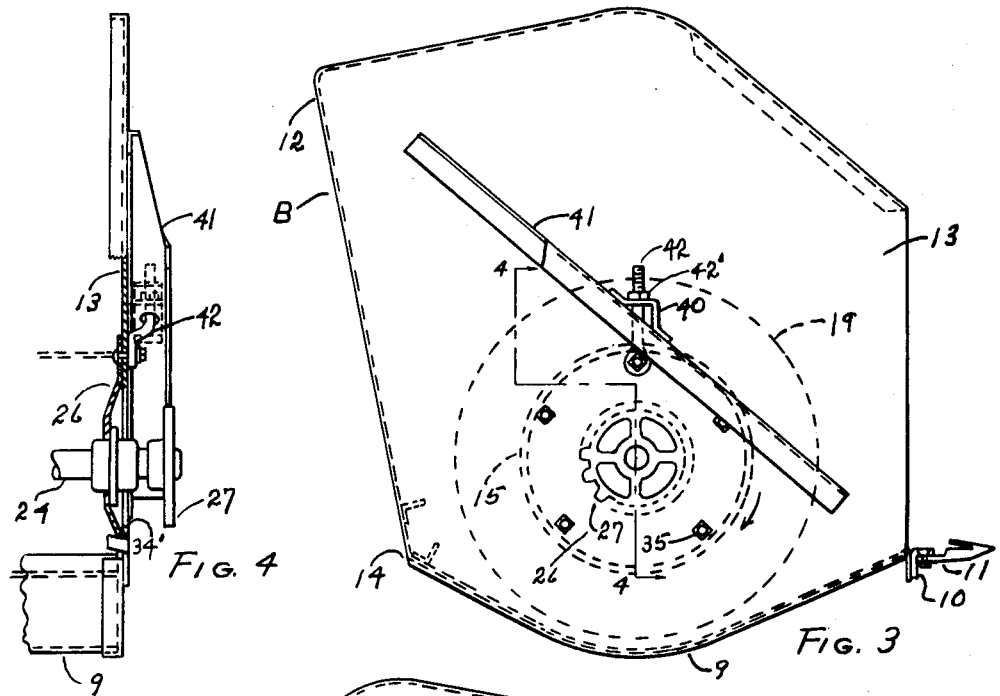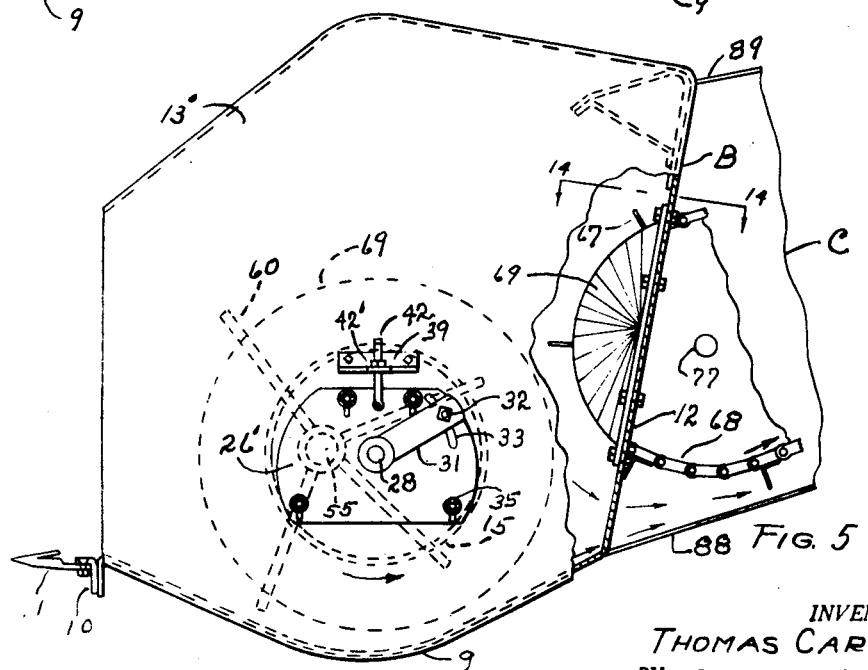

INVENTOR.
THOMAS CARROLL
BY James E. Nilles
ATTORNEY

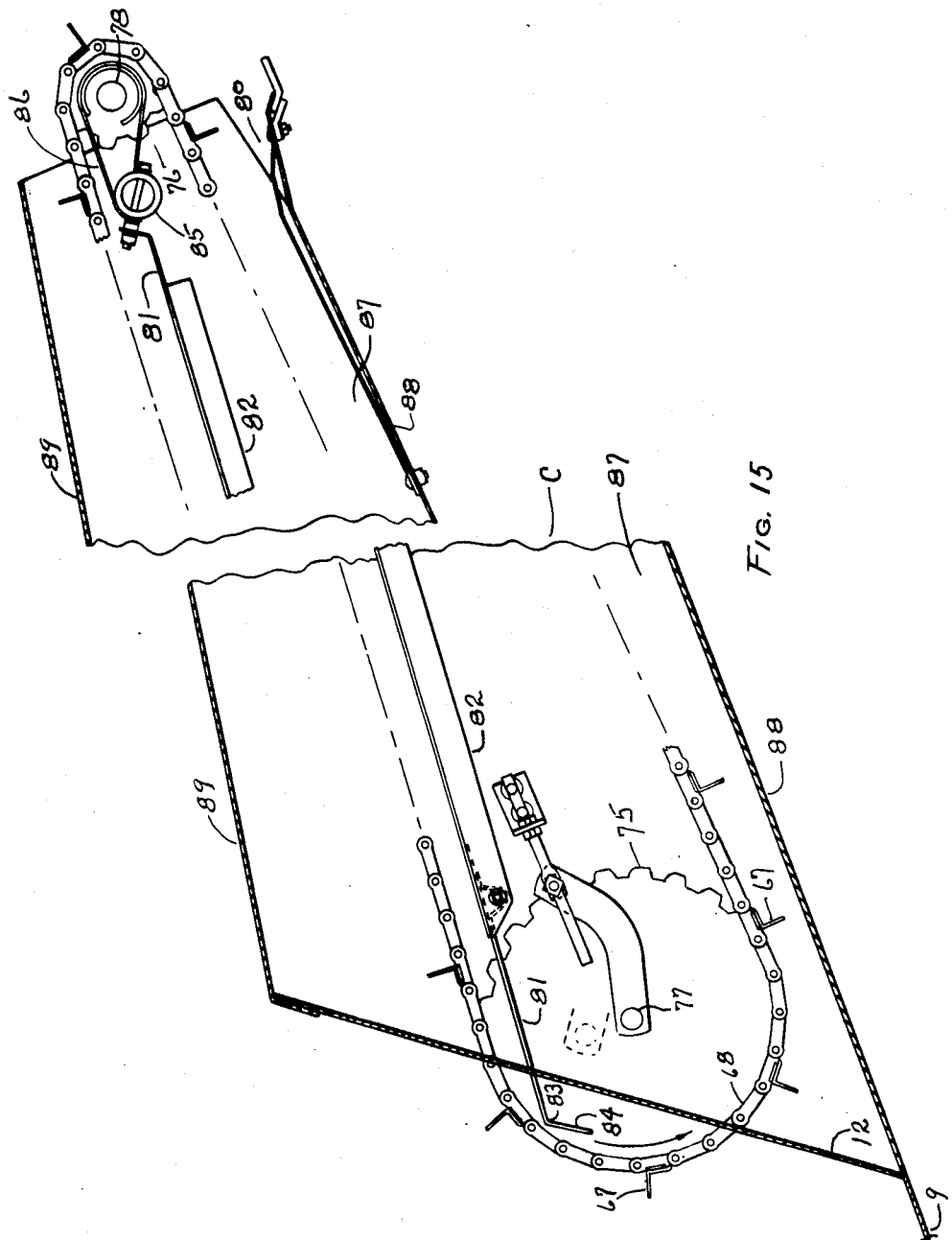

United States Patent Office 2,701,634
Patented Feb. 8, 1955

2,701,634

ROTATABLE CROP FEEDER WITH BEARINGS FOR RETRACTING FINGERS

Thomas Carroll, Toronto, Ontario, Canada, assignor to Massey-Harris Co. Ltd., Toronto, Ontario, Canada, a corporation of Canada Original application April 22, 1950, Serial No. 157,546, now Patent No. 2,696,290, dated October 8, 1954. Divided and this application December 28, 1953, Serial No. 400,560

6 Claims. (Cl. 198—211)

This application is a division of my co-pending application, Serial No. 157,546, filed April 22, 1950, and now Patent No. 2,696,290.

An important object of the present invention is the novel construction and operation of the bearings through which the fingers reciprocate.

To these and other useful ends, my invention consists of parts, combinations of parts or their equivalents and mode of operation as hereinafter described and claimed and shown in the accompanying drawings in which:

Fig. 1 is a partially sectioned side elevational view of a fraction of my improved auger tube.

Fig. 2 is an enlarged fractional longitudinal sectional view of the device as shown in Figure 1.

Fig. 3 is a right hand elevational end view of my auger table with the tube in its lowest adjusted position as indicated by dotted lines.

Fig. 4 is a longitudinal section through the right hand auger table end closure taken on line 4—4 of Figure 3.

Fig. 5 is a left hand end view of the table partially sectioned, illustrating the auger tube and flights by dotted lines and showing the lever used for adjusting the finger crank shaft, the end member being cut away so as to illustrate the position of the guiding cone.

Fig. 12 illustrates a fraction of the auger tube showing a sweeper blade in position and Fig. 13 illustrates a section taken on line 13—13 of Figure 12, illustrating a sweeper blade attached to the tube.

Fig. 14 is a top sectional view of the vertically extending portion of the trough taken on lines 14—14 of Figure 5, illustrating the protruding end of the elevator and the cone shaped guide members.

Fig. 15 is an enlarged view of the undershot elevator with the near side plate removed illustrating the means provided for gathering any grain that may fall between the upper flights and causing it to be discharged forwardly from between the flights so it can fall in front of the elevator and join the grain passing under the elevator.

Figure 6:
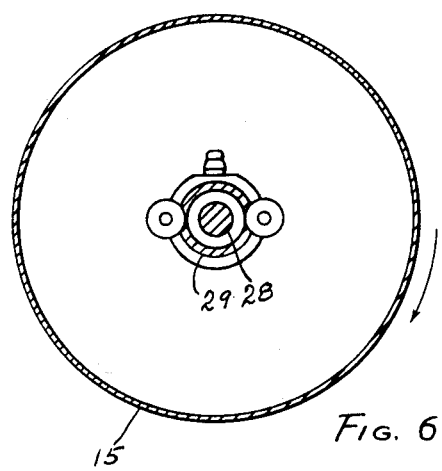
Fig. 6 is an end view of the auger tube taken on line 6—6 of Figure 1.

The present invention is shown as used in connection with a harvesting table which comprises a trough 9 having secured to its front edge for the length of the trough, an angle bar 10 having secured thereto spaced guards 11 forming a cutter bar adapted to carry a sickle bar in the usual manner. Trough 9 is provided with a generally vertically arranged extension plate 12. End closures 13 and 13' are secured to the ends of the trough and extension plate 12.

I provide an outlet 14 in the bottom of member 12 preferably midway its ends. This outlet extends upwardly from the rear edge of trough 9 terminating preferably as at B (see Figure 5). Trough outlet 14 has a suitable length for the free reception of the operating parts of an undershot type elevator which is designated in its entirety by reference character C. The operating parts of this elevator protrude forward through outlet 14 about as illustrated in Figures 5 and 14. Outlet is extended vertically far enough so the elevator may float over varying sized streams of grain as will hereinafter appear.

My complete auger conveyor tube is designated in its entirety by reference character A comprising preferably a relatively large single piece tube 15 or drum which forms a hollow outer structure (see Figure 1). I provide a number of access openings 16—16 having detachable lids 17 used for assembling, oiling and inspecting purposes.

Tube 15 has secured thereto auger flights 18 and 19 which extend from the ends of the tube preferably slightly past the adjacent ends of outlet 14. Auger flights 18 and 19 turn in opposite directions as indicated so as to move the cut grain toward the center of the trough or in front of outlet 14, the tube turning in the direction indicated by curvilinear arrows in Figures 3 and 5.

Tube 15 (see Figure 1) is rigidly secured to a shaft 24, this shaft being mounted on the right hand end closure 13 of the trough by means of a bearing 25, the bearing being secured to a plate 26 which is vertically adjustably secured to closure 13 as will hereinafter appear. Shaft 24 preferably carries a sprocket 27 on its outer end so member A may be chain driven. The other end of tube 15 is rotatably mounted on a shaft 28 in bearings 29—29. The outer end of shaft 28 is turnably mounted in end closure plate 26' by means of the hub of an arm 31 (see Figures 1 and 5).

The hub of arm 31 is rigidly secured to shaft 28 with the free end of the arm adjustably secured to closure member 26' (see Figure 5) in any suitable manner preferably by means of a bolt 32 and a slot 33 inthe end closure 26' for a purpose which will hereinafter appear. Bearing 25 and the hub of arm 31 are mounted on end closures 13 and 13' which are in turn vertically adjustably secured to these members as follows:

Members 13 and 13' have enlarged openings 34 and 34' through which shafts 24 and 28 extend and these plates (see Figures 3 and 5) are secured to members 13 and 13' by means of a number of bolts 35, the bolts extending through vertically arranged slots preferably in members 13 and 13' whereby the plates may be secured in vertically adjusted positions as follows:

A bracket 40 is secured to the outside of member 13 preferably by means of a stiffening bar 41. Another bracket 39 is secured to member 13'. Eye bolts 42—42 are secured to plates 26 and 26' which extend through brackets 39 and 40 having holding nuts 42'. Thus clearly by loosening the nuts on bolts 35, eye bolts 42 may be adjusted for raising or lowering plates 26 and 26' after which bolts 35 may be made taut so shafts 24 and 28 are rigidly, rotatably supported on the end closures 13 and 13' of the auger table.

After plates 26 and 26' have been adjusted, they may be made taut if desired, or bolts 35 may be adjusted loose enough so plates 26 and 26' are free to raise, permitting tube A to float over varying quantities of grain, nuts 42' acting to determine the lowest position of the tube.

I provide partitions 52 as shown in Figure 1 to which bearings 29 are secured. Shafts 28 and 53 protrude inwardly through bearings 29. The inner ends of these shafts are secured to crank brackets 54—54 and the outer ends of these crank brackets are secured to a crank shaft 55. Shafts 28 and 53 are in axial alignment with tube 15, and shaft 55 is parallel to shafts 28 and 53.

I will now describe the purpose of crank shaft 55 and its operating parts. A suitable number of fingers 60 are secured to bearings 61. Fingers 60 are preferably made from rectangular bars and their bearings are closely spaced as indicated (see Figures 1 and 2). In order to supply lubrication to these bearings, a grease gun fitting 62 is screw threaded into opening 62' which extends through the major length of crank shaft 55 and an outlet opening 63 is provided for each bearing 61; thus all of the bearings can be lubricated from one fitting.

Fingers 60 have a length, whereby when the crank shaft 55 is in any operating position the ends of the fingers can not move inwardly far enough to be disengaged from their guide bearings which in their entireties are designated by reference character D. Mounting means 65, 66 are mounted in apertures or openings 64 in tube 15 (see Figure 10). These mounting means or elements comprise straps 65 and 66 which form complementary semi-cylindrical sections or halves which are removably secured to member 15 on opposite sides of openings 64 in any suitable manner (see Figure 10). Bearing members 64' are preferably made from a synthetic compound so they will act noiselessly and can be readily replaced if worn out. It will be seen that bearings 64' present large wearing surfaces and that they are free to rotate between mounting means 65 and 66 and that the fingers are slidably mounted in these bearings. Mounting means 65 and 66 each have slots 65' through which fingers 60 extend without contact therewith.

I provide preferably four rows of circumferentially spaced finger assemblies and two or three fingers in each row. In the design shown there is a total of preferably ten fingers (see Figure 1). Therefore there will be two fingers longitudinally spaced in the position shown in Figure 7, three fingers in the position shown in Figure 8, three fingers in the position shown in Figure 9 and two fingers in the position shown in Figure 10, so that at each quater turn of tube 15, a number of longitudinally spaced fingers will be in the best position to engage the grain after it has been cut by the cutter bar and the fingers will be retracted early enough to disengage the grain before they pass outlet 14.

Figure 7:
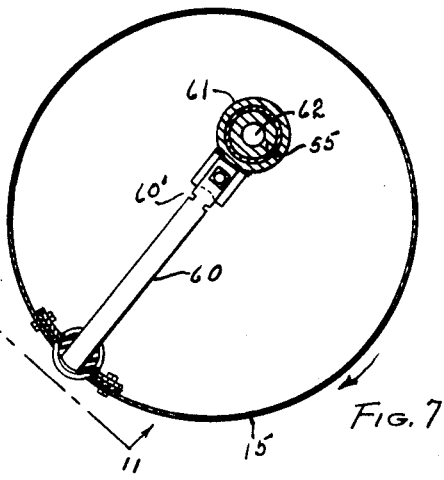
Figs. 7, 8, 9 and 10 illustrate the different positions assumed by the fingers with the tube in its lowest position and the finger crank in its highest position.
Figure 9:
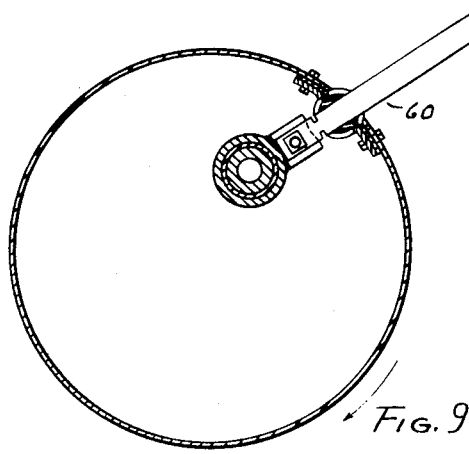

The fingers protrude farthest when shaft 55 is in the position shown in Figure 9, and the fingers are in their innermost position as shown in Figure 7 when shaft 55 is in the position shown in this figure. In these positions plates 26 and 26' are in their lowest position relative to trough 10, the position of shaft 55 being such as will cause the fingers to be retracted as they pass upwardly past outlet 14. Thus as illustrated in Figure 7, the rear fingers will be fully retracted so as not to carry the grain upward past the platform outlet.

Figure 8:
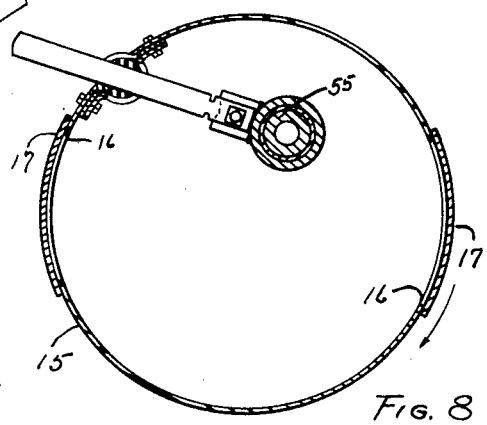
Figure 10:
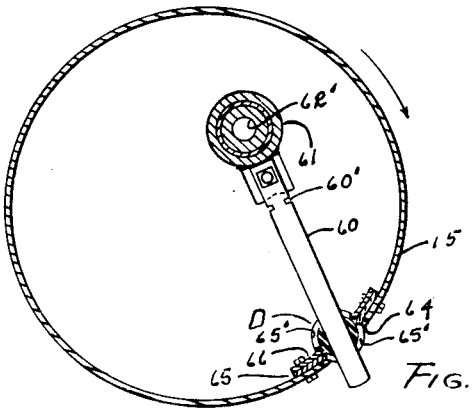
Figure 11:
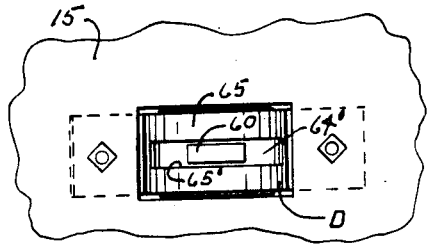
Fig. 11 is a front view of a fraction of the auger tube looking into the protruding end of a finger.

The positions of the other fingers are substantially as shown in Figures 8, 9 and 10. Clearly as shaft 55 is moved around shafts 28 and 53 as axes, the relative position of the fingers will be changed from the positions shown, whereby they revolve around shaft 55 as an axis and engage the grain in a manner to most efficiently move the grain rearwardly toward the outlet in any vertical position of tube 15.

It will be seen that the fingers move out and in through bearings D at every revolution of the auger shaft and at various angles.

Clearly minor detail changes may be made in the design shown without departing from the spirit and scope of my invention as recited in the appended claims.

Having thus shown and described my invention, I claim:

1. A material-handling device, comprising: an elongated rotatable drum having its peripheral wall provided with a plurality of rectangular apertures spaced apart both lengthwise and circumferentially of the drum and each said aperture being relatively short as compared with the length of the drum; a fixed shaft extending lengthwise of and within the drum and positioned eccentrically to and paralleling the drum axis; a plurality of finger members pivoted at their inner ends to the fixed shaft and projecting outwardly respectively through the apertures in the drum wall, each of said fingers in cross section being relatively smaller than its aperture so as to pass loosely through such aperture; a plurality of individual cylindrical bearings, one for each aperture and associated finger member, each bearing being arranged with its axis parallel to the drum axis and being of such axial length and diameter as to be received by its associated aperture so that diametrically opposed portions thereof lie respectively within and outside the drum wall and fixed against shifting lengthwise of the drum, and each bearing having a single diametrical aperture therein to slidably receive its associated finger member for reciprocation of such finger member relative to the bearing and drum wall as the drum is rotated; and a plurality of individual mounting means, one for each bearing, each mounting means being secured to the drum wall and constructed to carry its associated bearing for rocking about the axis of such bearing relative to the drum wall.

2. The invention defined in claim 1, further characterized in that: each mounting means comprises a pair of complementary semi-cylindrical sections, one embracing the part of its bearing outside the drum wall and the other embracing the part of its bearings inside the drum wall; each pair of sections being secured together and to the drum wall.

3. A material-handling device, comprising: a rotatable drum having its peripheral wall provided with a plurality of relatively small apertures arranged in both circumferentially and axially spaced relation relative to the drum axis; a fixed shaft extending lengthwise of and within the drum and positioned eccentrically to and paralleling the drum axis; a plurality of finger members pivoted at their inner ends to the fixed shaft and projecting outwardly respectively through the apertures in the drum wall, each of said fingers in cross section being relatively smaller than its aperture so as to pass loosely through such aperture; a plurality of individual bearings, one for each aperture and associated finger member, each bearing being of such size as to be received at least partly in its associated aperture so as to be partly within and partly outside the drum wall and fixed against shifting lengthwise of the drum, and each bearing being apertured to slidably receive its associated finger member for reciprocation of such finger member relative to the bearing and drum wall as the drum is rotated; and a plurality of mounting means, one for each bearing, each mounting means being secured to the drum wall and constructed to carry its associated bearing for rocking about an axis transverse to the path of reciprocation of its associated finger member; said mounting means comprising a pair of complementary halves, one embracing the part of its bearing outside the drum wall and the other embracing the part of its bearing inside the drum wall; each pair of sections being secured together and to the drum wall.

4. For use in a material-handling device of the character having a rotatable drum provided with perforations in its peripheral wall and a plurality of reciprocating and oscillating fingers projecting respectively outwardly through the perforations: means for carrying a finger in the drum wall, comprising a bearing having a principal axis and positionable adajcent to a drum wall perforation with said principal axis parallel to the axis of rotation of the drum, said bearing further having therein an aperture normal to said principal axis and adapted to slidably receive a finger projecting through that perforation, and a mounting element carrying the bearing for rocking about its said principal axis, said element having means thereon adapted to be affixed to the drum wall for mounting the bearing in position as aforesaid; said bearing being symmetrical about its principal axis, and the mounting element comprising a pair of complementary substantially semi-cylindrical halves separably fitting together to embrace the bearing, each element half having an opening therethrough in register with the bearing aperture.

5. The invention defined in claim 4, further characterized in that: at least one of the mounting element halves is provided with an ear portion for affixation thereof to the drum wall.

6. For use in a material-handling device of the character having a rotatable drum provided with perforations in its peripheral wall and a plurality of reciprocating and oscillating fingers projecting respectively outwardly through the perforations: means for carrying a finger in the drum wall, comprising a bearing having a principal axis and positionable adjacent to a drum wall perforation with said principal axis parallel to the axis of rotation of the drum, said bearing further having therein an aperture normal to said principal axis and adapted to slidably receive a finger projecting through that perforation, and a mounting element carrying the bearing for rocking about its said principal axis, said element having means thereon adapted to be affixed to the drum wall for mounting the bearing in position as aforesaid; said mounting element comprising a pair of complementary, substantially semi-cylindrical halves separably fitting together to embrace the bearing, each element half having an opening therethrough in register with the bearing aperture and each separable element half has a pair of apertured ears respectively registrable to receive a pair of securing means for affixation of the element halves to the drum wall.

References Cited in the file of this patent

UNITED STATES PATENTS

| | | |
|---|---|---|
| 2,633,231 | Pilcher | Mar. 31, 1953 |
| 2,644,292 | Oberholtz et al. | July 7, 1953 |